Feb. 22, 1944.   W. DÄLLENBACH   2,342,254
RESONANCE DEVICE FOR ULTRA-SHORT WAVES
Filed March 18, 1941   2 Sheets-Sheet 1

Inventor
WALTER DÄLLENBACH,
By Bailey P. Larson
Attorney

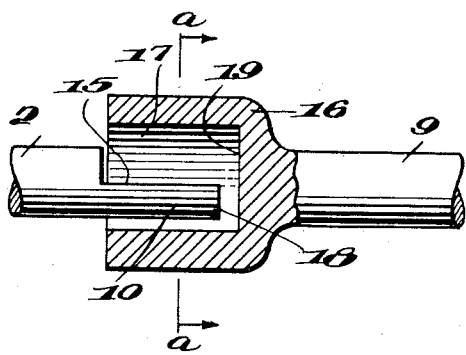
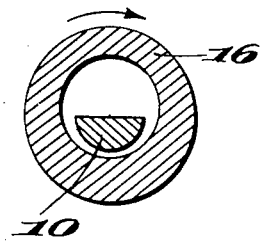
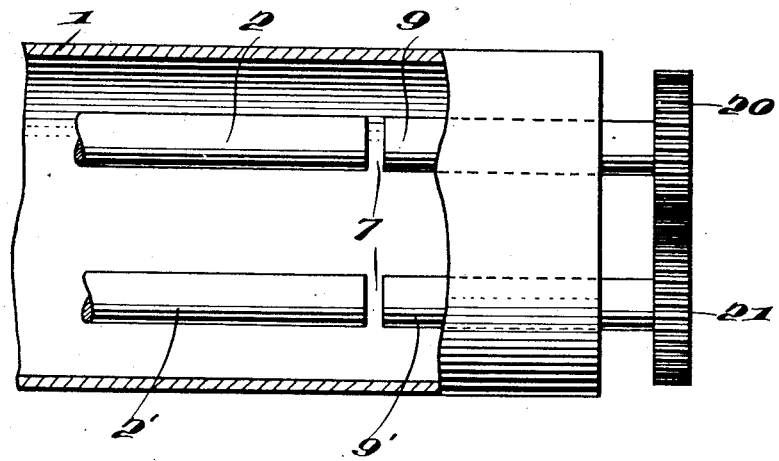

Patented Feb. 22, 1944

2,342,254

UNITED STATES PATENT OFFICE 2,342,254

RESONANCE DEVICE FOR ULTRA-SHORT WAVES

Walter Dällenbach, Berlin, Germany; vested in the Alien Property Custodian

Application March 18, 1941, Serial No. 384,019
In Germany July 15, 1939

1 Claim. (Cl. 178—44)

This invention relates to devices for measuring distances by employing ultra high frequency radio waves. In carrying out this invention I employ an ultra high frequency resonator of a type which will permit adjustment in such a manner as to vary the frequency of the oscillation produced in the resonance system. In certain cases, explained more fully below, it is important that the resonator be capable of adjustment so that the frequency may be varied periodically. Such devices, when incorporated in proper electrical circuits may be advantageously used in measuring distances by means of the frequency wabbling method. This method may be briefly described as comprising means whereby an ultra high frequency radio wave is transmitted and reflected from an object into a suitable receiver. The receiver is constructed in such a manner as to permit the reception of the directly transmitted wave as well as the reception of the reflected wave. The two waves superpose each other and the size of the beat frequency permits one to measure the distance of the receiver from the point of reflection. The resonance system may comprise a single tuned straight line conductor or a plurality of conductors such as, for example, a concentric Lecher system. It is immaterial whether or not the conductors are shielded. In those cases wherein a Lecher system is to be used it is preferred that it be of the hollow space type having an inner conductor.

According to this invention, the resonance devices are constructed in such a manner that one or all of the conductors are provided with a gap intermediate their respective ends. If a concentric Lecher system is to be employed, the gap is provided in the inner conductor. In proximity to the gap, parts of the conductor are formed or profiled in such a manner that the parts may be rotated around their longitudinal axes to periodically vary the capacitance formed by the gap. This variation is produced without shifting the parts along their respective longitudinal axes.

In order that a better understanding may be obtained of the nature of this invention, reference is now made to the accompanying drawings wherein:

Fig. 2a shows in sectional elevation the inner conductor 2 of the Lecher system of Fig. 1.

Fig. 2b shows a vertical end view of the inner conductor of Fig. 2a.

Fig. 3 depicts a curve showing a straight line variation of capacitance obtained under certain conditions.

Fig. 4a shows in sectional elevation a modification of the inner conductor 9.

Fig. 4b shows a vertical end view of the conductor shown in Fig. 4a.

Fig. 6 shows another modification of the conductor 9.

Fig. 6(a—a) is a vertical cross section taken on lines a—a of Fig. 6; and

Fig. 7 shows a further modification of my invention.

Figure 1:
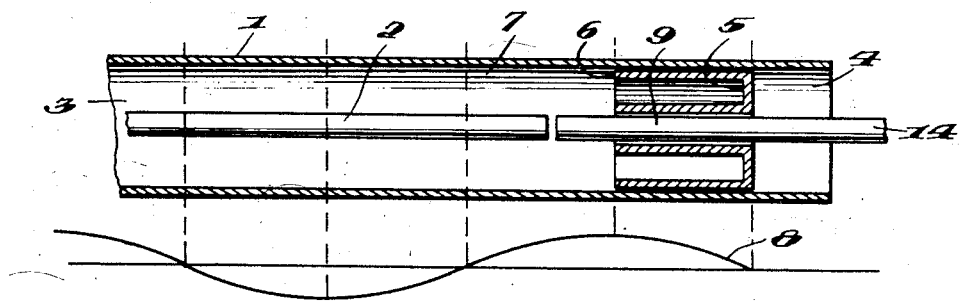
Fig. 1 shows a concentric Lecher system.
Figures 2A, 2B, 3:
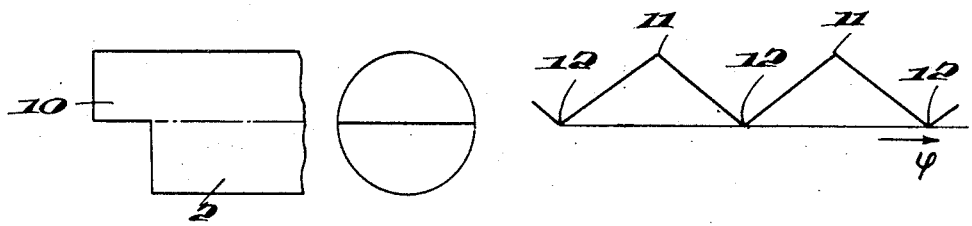
Figures 4A, 4B:
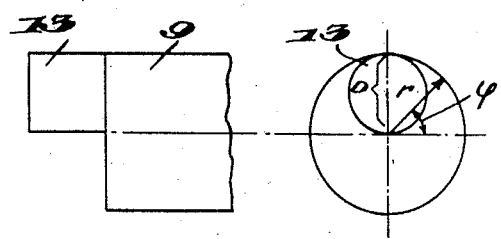
Figure 5:
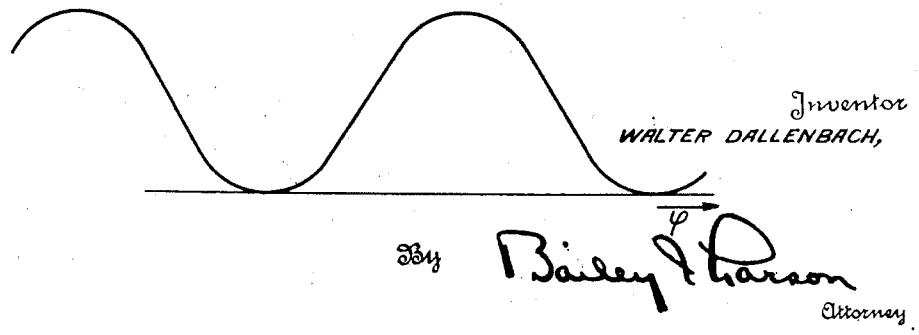
Fig. 5 shows the variation of capacitance in the shape of a sine wave.

Referring now more specifically to Figure 1, I have shown a concentric Lecher system having an inner conductor 2, 9, provided with a gap 7 intermediate its end. By shifting a short circuiting device, as for example, the piston 5, the disconnection point or gap 7 can be shifted from a potential node to a potential loop and vice versa. In Figures 2a and 4a, cross-sectional views of the inner conductors are shown, which when turned effect a periodical variation of the capacity. These variations are dependent upon the torsion angle as shown in Figures 3 and 5. Figure 3 corresponds to that embodiment of the invention as shown in Figures 2a and 2b, while Figure 5 corresponds to Figure 4a and 4b. The Figures 6 and 6(a—a) disclose a further embodiment of this invention in which a more positive coupling between the two parts of the conductor is obtained. Figure 7 discloses a two wire line set up in a metallic casing.

Referring again to Figure 1, I have shown a concentric Lecher system having an outer conductor I and an inner conductor 2. The inner conductor 2 is connected at a point 3 to an ultra high frequency generator. At the end 4 the Lecher system is closed and short circuited by a piston 5 which has the length of $\lambda/4$ ($\lambda$=wave length), for receiving small contact resistance. Such devices have already been described in the specification of the patent issued to Pupp, No. 2,226,479, Serial No. 186,454. The inner conductor of this energy line is provided with a gap at 7. This gap forms a series capacity having a definite value. The wave length of the oscillations produced by the generator may be varied by shifting the piston 5 longitudinally. The energy line as shown at Figure 1 may be used in order to produce a continuous variation of the wave length, as for example, by employing an additional hollow space as has already been described in the patent issued to Dallenbach et al., No. 2,163,589, and in the patent application now pending by the same inventors, Serial No. 264,246.

Considering at this time the case wherein the capacity 7 has an infinite value, the distribution of the voltage will occur as is demonstrated by the curve 8. When the capacity 7 is at the point of a potential loop it will have no influence on the potential distribution nor on the wave length. This also occurs if the capacity reaches a limited value. If on the contrary the capacity 7 is shifted away from the potential loop to a current loop then of course the potential will reach a minimum as is shown in Figure 1. The variation of the potential and current distributions along the energy line are produced by changing the capacity 7. The variations of the capacity 7 produce a greater effect as the capacity nears a current loop.

When employing this device to measure distance it will be found advantageous to provide a means whereby the capacity 7 may be varied in order to produce periodical variations in the wave lengths, the waves having a frequency of 10 to 100. This problem may be solved by providing means whereby the part 9 of the inner conductor may be coupled to a motor revolving approximately 3000 revolutions per minute. The shaft 9 in rotating produces a periodical variation of the capacity 7 as the end parts 2 and 9 of the inner conductor move through planes not perpendicular to the longitudinal axis.

Figures 2a and 2b show such a device wherein the free ends of the conductors 2 and 9 at the gap 7 are disclosed in an enlarged scale in sectional elevation as well as side elevation. In this embodiment the conductor 2 has a semicircular portion 10 projecting at one end thereof and conductor 9 is provided with a similar portion. Portions 10 of the conductors 2 and 9 oppose each other in a tight slit forming a field space having a definite capacity. If the conductor 9 and the conductor 2 are held immovable, the capacity 7 will be dependent upon the angle of torsion $\psi$ as is shown by the curve in Figure 3. At the point 11 in Figure 3, the capacity is at a maximum and the two projections or continuations of the conductors are positioned opposite each other. When the capacity reaches a minimum value as at a point 12 (Fig. 3) the two continuations 10 of the conductors 2 and 9 are displaced opposite each other at an angle of 180°. If it is desired to obtain a sine curve by variation of the capacity 7, one of the conductors, as for example, conductor 2, can be constructed as per Figures 2a and 2b while the end 7 of the conductor 9 can be constructed as shown in Figures 4a and 4b. As will be seen from Figures 4a and 4b, the conductor 9 has a projection 13 substantially circular in cross-section instead of having a half circle cross section as is disclosed in Figures 2a and 2b. As per the theoretical calculations and considerations, the limiting curve of the continuation 13 must satisfy the following equation:

$$r = D \sqrt{\sin \phi}$$

The variation of the capacity 7 is dependent upon the angle of torsion of shaft 9 as is shown in Figure 5, and is analogous to Figure 3.

Figures 2a and 2b and 4a and 4b disclose two embodiments of this invention wherein the maximum value of the variable capacity 7 is limited by the measurements of the cross sections of the conductors of the profile continuations 10 and 13. In the same manner, the degree of coupling of both of these parts 2 and 9 is limited.

In order to obtain a more firm coupling as is sometimes necessary in order to produce a periodical variation of the frequency, the adjacent ends of the conductors can be advantageously constructed as per Figures 6 and 6(a—a). The conductor 2 is constructed in a manner similar to that shown in Figure 2, and is provided with a continuation or projection 10 having a semicircular cross sectional area. The adjacent part 16 of the other conductor is somewhat thicker in diameter than the shaft 9 and is provided with an eccentric bore 17 in which the continuation 10 of the conductor 2 projects. One or both of these parts of the conductors 2 and 9 when rotated around their longitudinal axis will produce a periodical variation of the capacity 7 dependent upon the variation of the distance of the outer surface of the continuation 10 from the inner surface of the eccentric bore. The capacity 7 is at a minimum value when the plane surface 15 of the continuation 10 faces downwardly. On the other hand, the capacity between the front surfaces 18 and 19 will not vary and form a constant additional capacitance.

By accurately constructing the bore 17 and projection 10 any desired value of the capacity 7 may be obtained. The bore 17 and the continuation 10 may be constructed in any form analogous to those described in order to obtain a series capacity that may be varied to obtain a capacity of any desired value, the capacity 7 being dependent upon the profiling of the adjacent ends of the conductors.

A further embodiment of my invention is shown in Figure 7. In this figure I have shown two conductors 9 and 9' surrounded by a metallic shield 1. One end of each of the two conductors is secured to gear wheels 20 and 21. Rotation of the gear wheels will produce the variation of capacity in the same manner as is described above. Depending upon the selection of the gear wheels a sympathetic or unsympathetic variation of the series capacity will take place.

The invention is not to be limited to the specific disclosure but only by the scope of the following claim.

I claim:

A resonance device for ultra short waves, comprising, two elongated conductor members positioned in axial alignment and having adjacent ends which are positioned with a gap therebetween, one of said ends being in the form of an enlarged boss having a recess opened toward the other of said ends and eccentric with respect to the axis of the conductor, and the other of said ends being positioned within said recess and being formed eccentrically with respect to said axis, whereby rotation of one of said conductor members about said axis causes a variation in the capacitance between said ends.

WALTER DÄLLENBACH.